UNITED STATES PATENT OFFICE.

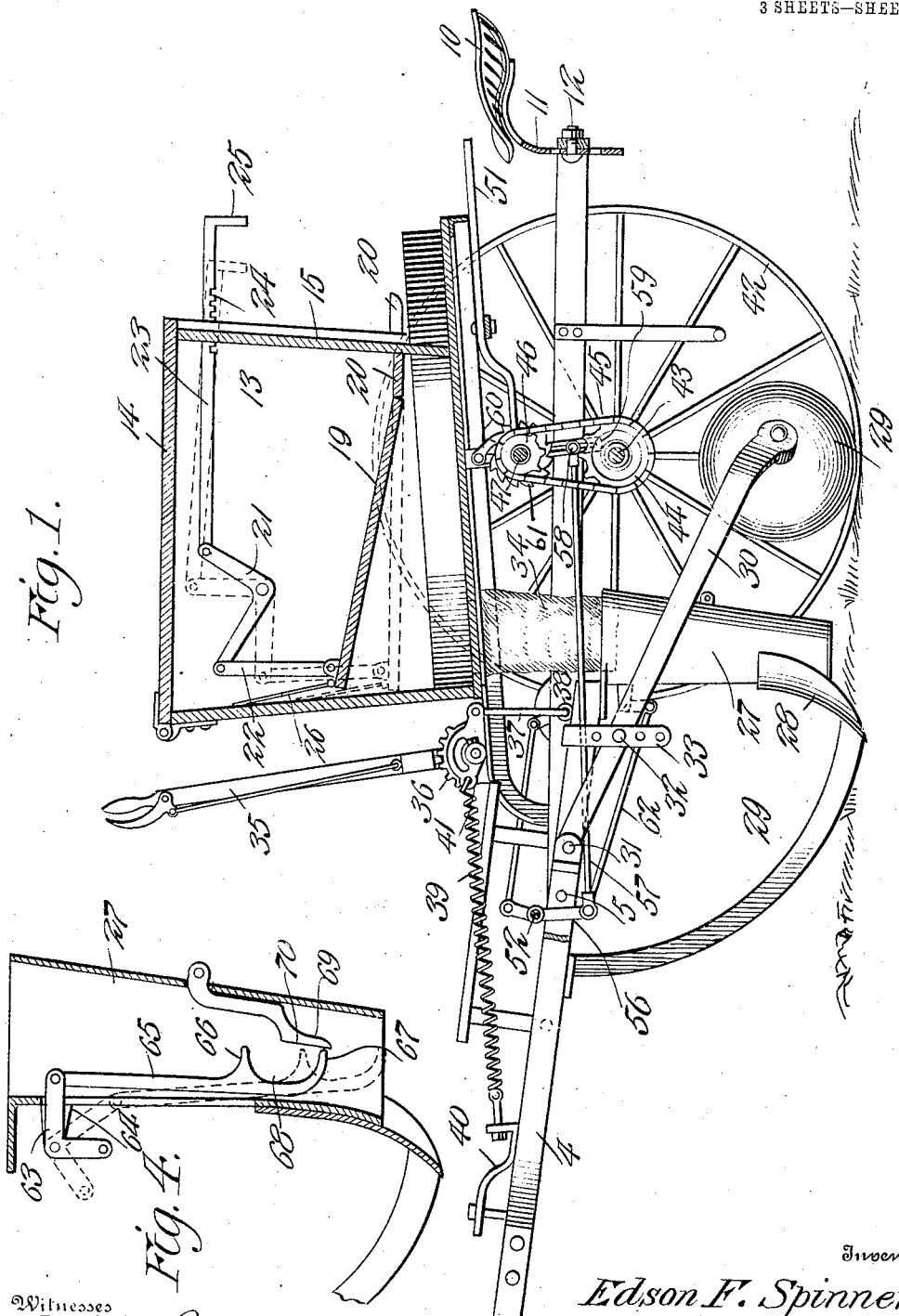

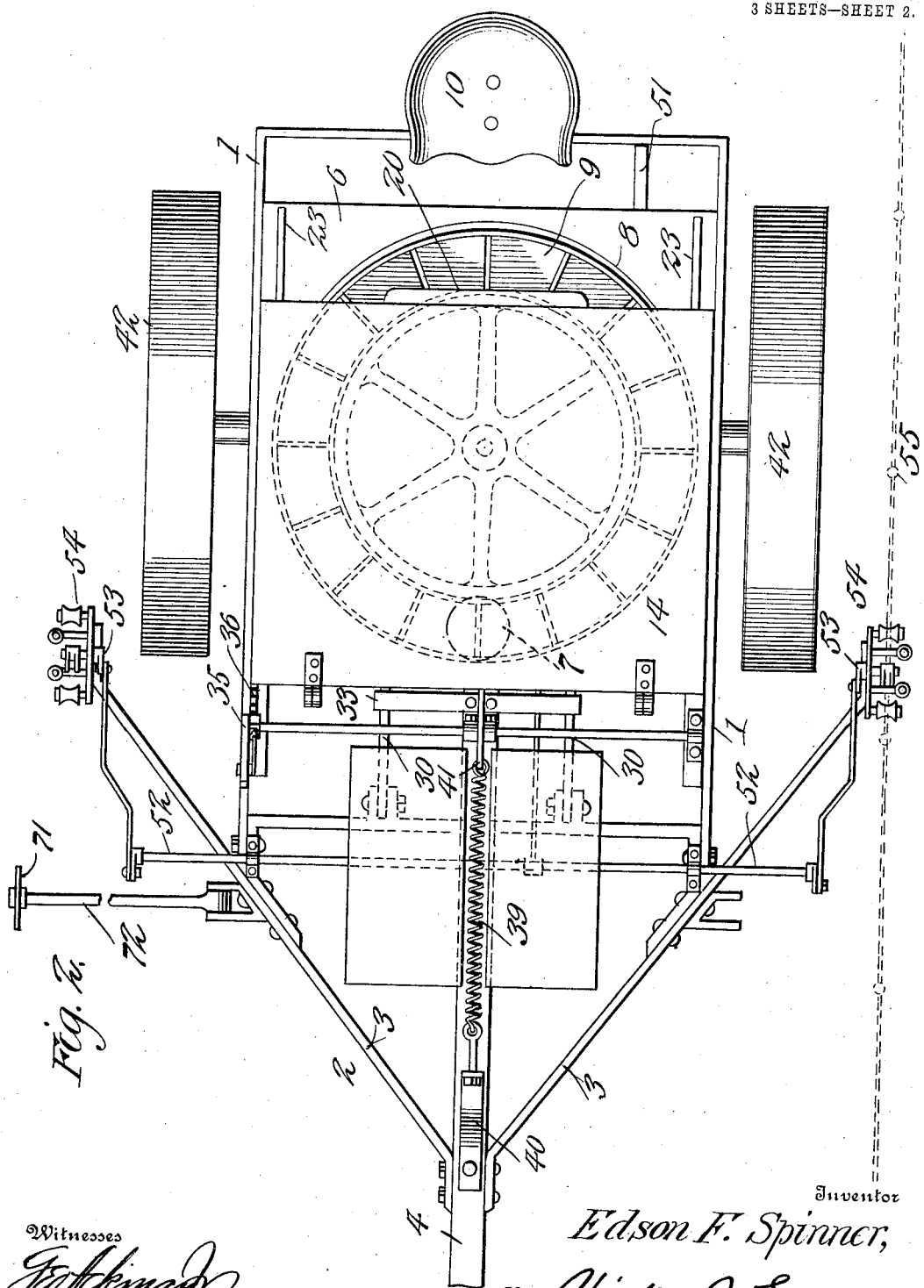

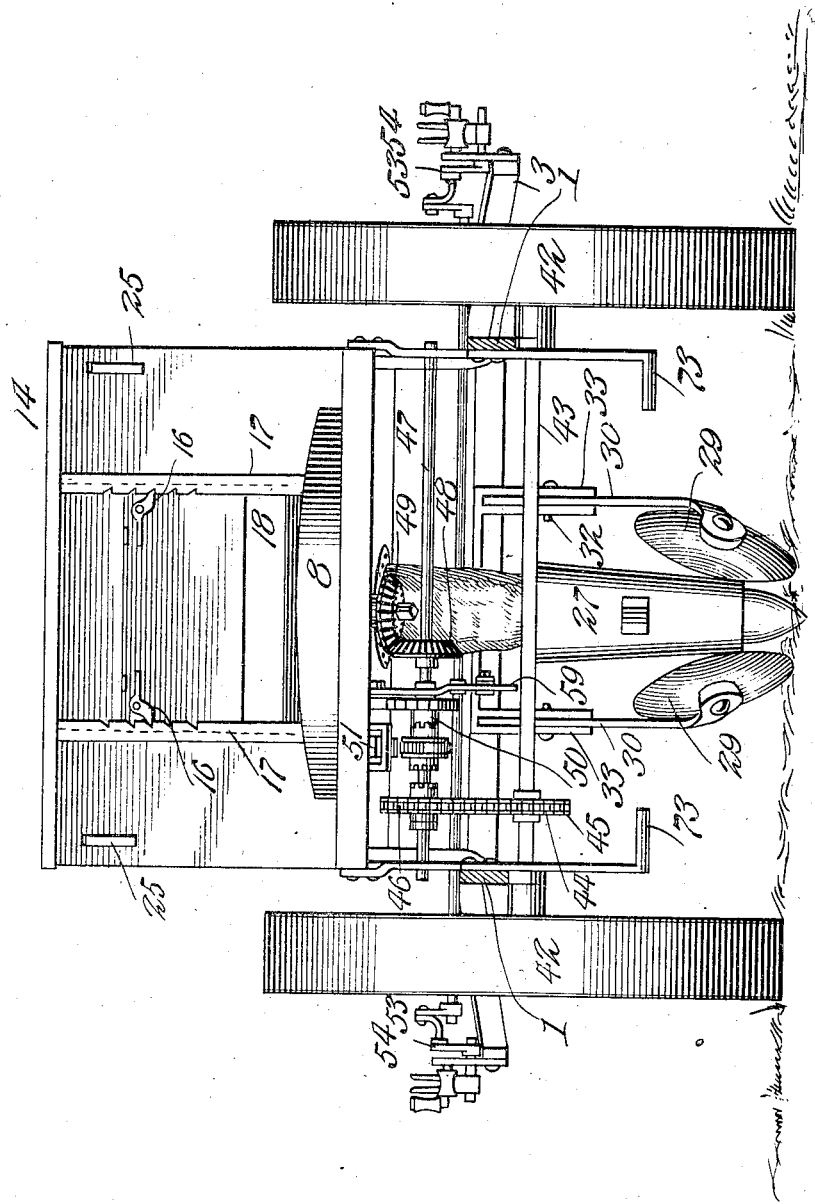

EDSON FITCH SPINNER, OF AVA, ILLINOIS.

POTATO-PLANTER.

No. 893,395.     Specification of Letters Patent.     Patented July 14, 1908.

Application filed October 25, 1907. Serial No. 399,159.

*To all whom it may concern:*

Be it known that I, EDSON FITCH SPINNER, a citizen of the United States, residing at Ava, in the county of Jackson and State of Illinois, have invented new and useful Improvements in Potato-Planters, of which the following is a specification.

This invention relates to potato planters, the object of the invention being to provide a simple, reliable and effective machine for planting potatoes and other seed in such manner that the plants or seeds may be accurately laid in rows and subsequently cultivated in rows both ways thereby securing better cultivation of the growing crop and better results. Plowing, harrowing and seeding may be carried on simultaneously from one side of the field and if interrupted by unfavorable weather conditions may be subsequently reassumed without any loss of labor.

By means of the construction hereinafter described seed potatoes of any size or whole potatoes may be planted either one or two pieces or any desired number of pieces at a time and such pieces are not mutilated or injured in any way. The mechanism described also insures the planting of seed in each and every hill and the machine may be used either as a check row planter or as a drill planting machine. A marker may also be used in connection with the machine and forming a guide whereby subsequent movement of the machine across the field may be accurately defined.

With the above and other objects in view, the nature of which will more fully appear as the description proceeds the invention consists in the novel construction, combination and arrangement of parts herein fully described, illustrated and claimed.

In the accompanying drawing:—Figure 1 is a vertical longitudinal section through a planting machine embodying the present invention.
Fig. 2 is a plan view of the machine with the hopper removed, showing the revolving disk and adjustable hopper bottom. Fig. 3 is a rear elevation of the machine, and Fig. 4 is an enlarged vertical section through the boot showing the valve mechanism and part of the operating connections therefor.

The frame of the machine contemplated in this invention is preferably composed of angle iron, as indicated in Fig. 1 and comprises a rectangular rear or main portion 1 and a forward angular portion 2 embodying rearwardly diverging bars 3 connected rigidly at their forward ends to the machine tongue 4, the forward and rear portions of the machine frame being pivotally connected together at 5 so to admit of a relative rocking movement thereof for the purpose of adjusting the elevation of the furrow opener and boot as well as the coverer, thereby enabling the depth of planting to be regulated to suit all conditions.

Mounted upon the main section 1 of the machine frame is a deck 6 provided near the front thereof with an opening 7 through which the seed may pass as the latter are delivered thereto by the revolving feeder disk 8 which is mounted directly upon the deck 6 and comprises an annular series of pockets or receptacles 9 in which the seed are placed by an attendant who occupies a seat 10 mounted at the rear of the machine, said seat being shown mounted upon a standard adjustably connected to the rear cross bar of the frame by a bolt or other suitable fastening 12 which may be inserted through any one of the series of holes in the standard 11, as indicated in Fig. 1.

Surrounding the greater portion of the disk 8 and extending upward above the same is a hopper 13 provided with a hinged cover or lid 14 and also provided at the rear with a door or slide 15 movable up and down in suitable guide ways and adapted to be held at any suitable elevation by means of pawls 16 engaging racks 17, as shown in Fig. 3, thereby adapting any size opening 18 to be left beneath the lower edge of the slide for the discharge of potatoes or seeds to the operator on the seat 10. Within the hopper 13 is mounted an inclined adjustable hopper bottom 19, the lower end of which is associated with a table 20 which extends outward in rear of the slide 15 to enable the operator on the seat 10 to take the potatoes or seed from said table and deposit them in the pockets 9 of the feeder disk. The forward edge of the bottom 19 is adapted to be raised and lowered for giving the necessary inclination to the adjustable bottom to cause the material to gravitate rearward to and upon the table 20 by means of one or more bell crank levers 21 one arm of which is connected by a link 22 to the bottom 19 and the other arm of which is connected to a handle bar or rod 23 which extends outward through an opening in the rear of the hopper and is provided with teeth 24 adapted to engage a lug or shoulder on the hopper to hold said handle bar at any desired point of adjustment. The rear end of said handle bar is provided with a crook or handle 25 to facilitate the operation thereof. 26 represents a plate jointed to the free edge of the inclined bottom 19 and resting at its free edge against the inclined front wall of the hopper, as shown in Fig. 1, said plate acting as a guard or apron to insure the potatoes or seed being carried on to the inclined bottom 19. The dotted lines in Fig. 1 indicate clearly the manner of adjusting the inclined bottom 19, the object of which as before stated is to insure the potatoes reaching the table 20 from which they are taken by the operator and deposited in the pockets of the feeder disk.

Arranged below the discharge opening 7 in the deck is a boot 27 carrying a shovel or furrow opener 28 connected by a suitable brace 29 with the machine frame while traveling in rear of the furrow opener are one or more covering disks 29 the same being mounted on the corresponding number of arms 30 pivoted at their forward ends to the machine frame 31 and adjustable up and down by means of pins 32 and apertured brackets 33 on the machine frame, whereby the elevation of the coverers 29 may be adjusted. A flexible boot section 34 embraces the discharge opening 7 in the deck 6 and extends into the upper end of the boot 27 to conduct potatoes or other seed into the boot.

It will be noted that as the forward and rear sections of the machine frame are rocked relatively to each other on their pivotal connection, the effect is to raise or lower the furrow opener 28 and also the coverers 29. This is accomplished by means of a thumb latch lever 35 working in connection with a segment rack 36 on the machine frame and connected by a link 37 with an eye 38 on the rear end of the tongue 4. 39 designates a spring connected at one end to a clip 40 on the tongue and at its opposite end to an extension or arm 41 of the lever 35. It will now be seen that by rocking the lever 35, the rear end of the tongue 4 will be raised or lowered as the case may be, thus correspondingly raising or lowering the forward end of the rear or main section 1 of the machine frame, to which the furrow opening and closing devices are connected.

The machine is supported upon a pair of carrying wheels 42 connected by an axle 43 which constitutes the main driving axle of the machine. To adapt the machine to be used as an ordinary drill planter, a sprocket wheel 44 is mounted fast on said axle and has a chain 45 extending therefrom around another sprocket wheel 46 on a counter or operating shaft 47 which is connected by beveled gears 48 and 49 to the revolving disk 8, thus causing said disk to revolve continuously and intermittently drop the seed from the pockets 9 into the discharge opening 7. When the machine is used as a check row planter, the wheel 46 is thrown out of engagement with the shaft 47 by means of a clutch 50 which is shifted by means of a clutch lever 51 extending rearward to within a convenient reach of the operator occupying the seat 10. The seed dropper mechanism is then operated by means of a rocking shaft 52 mounted on the forward portion of the machine frame and provided at opposite ends with rocker arms 53 carrying at their outer ends check row devices 54 which are intermittently engaged by projections or shoulders on a check row line indicated by dotted lines at 55 in Fig. 2. As the rocker arms 53 are vibrated by the check line, the rocker shaft 52 is oscillated and in order to impart motion from said shaft to the revolving disk 8, the rocker shaft 52 is provided with a lever arm 56 to which is attached the forward end of a connecting rod 57 the rear end of which is adjustably connected by a pin and slot attachment, as shown in 58 to a ratchet lever 59 journaled on the counter-shaft 47 and carrying a pawl 60 which engages the teeth of a ratchet wheel 61 fast on said shaft 47. In this way intermittent motion is imparted to the revolving disk 9 and by means of the adjustable connection 58, the movement of said disk may be perfectly regulated and timed so as to halt the disk each time a pocket thereof comes over and above the discharge opening 7 in the deck. Another connecting rod 62 extends from the lever arm 56 or another similar lever arm, to a bell crank lever 63 which is fulcrumed on a bracket or lug 64 on the boot 27. The other arm of said lever has pivotally attached thereto a slide valve 65 having oppositely arranged shoulders 66 and 67 with an intervening space or pocket 68. This valve with its shoulders 66 and 67 is located wholly within the boot 27 and operates opposite to and in conjunction with an abutment plate 69 also located inside of the boot and embodying a flat working surface 70 against which the shoulders 66 and 67 of the valve move. The shoulders 66 and 67 are so proportioned and arranged with relation to the working face of the abutment plate 69 that a space is left for the potatoes or seed to find their way into the pocket 68 when the valve is raised, as shown by the full line position in Fig. 4 and to find their way out of said pocket when the valve is depressed or lowered to the position indicated by dotted lines in the same figure. The potatoes or seed thus escaping are dropped from the lower extremity of the boot into the furrow and it will be observed that the movement of the valve may be nicely adjusted and timed to insure the accurate discharge of the seed in the furrow.

71 designates a marker wheel carried by an arm 72 connected to a suitable point of the machine frame, said marker wheel being designed for the usual function of marking off the ground, forming a guide for the driver when directing the machine again across the field, the driver using the top of the hopper as a seat. Suitable foot rests 73 are provided for the operator who occupies the rear seat 10.

The machine hereinbefore described is susceptible of considerable change in the form and minor details of construction which may be accordingly resorted to without departing from the principle or sacrificing any of the advantages of the invention.

I claim:—

1. A seed planter comprising a machine frame, a deck thereon having a discharge opening, a revolving feeder disk embodying pockets adapted to be moved into communication with said discharge opening, a hopper arranged above said disk, an inclined adjustable bottom for said hopper, and a table arranged adjacent to the lower end of said inclined bottom.

2. A seed planter comprising a machine frame, a deck mounted thereon and provided with a discharge opening, a revolving feeder mounted on said deck and provided with pockets movable into communication with said discharge opening, a hopper extending above said disk and provided with a discharge opening and a slide for controlling the size of said opening, a table arranged adjacent to said discharge opening, and an adjustable inclined bottom for said hopper terminating adjacent to the table.

3. A seed planter comprising a machine frame, a deck mounted thereon having a discharge opening, a pocketed revolving feeder disk mounted on said deck, a hopper located above said disk and provided with a discharge opening, a table adjacent to said opening, a pivoted and inclined hopper bottom leading to said table, and lever connections for adjusting and maintaining the inclination of the hopper bottom.

4. A seed planter comprising a machine frame, a deck mounted thereon and provided with a discharge opening, a pocketed rotary feeder disk mounted on said deck, carrying wheels for the machine frame, an axle connecting said wheels, a counter-shaft parallel to said axle, and means for imparting intermittent motion to the counter-shaft and revolving disk embodying a check row operated rock shaft, and pawl and ratchet mechanism interposed between the said check row shaft and counter-shaft.

5. A seed planter embodying a machine frame a main axle, carrying wheels thereon, an apertured deck, a pocketed feeder disk mounted on said deck, a counter shaft parallel with the main axle and geared to said disk for imparting rotary motion to the latter, a ratchet wheel fast on said counter shaft, a check row operated rock shaft, a ratchet lever operatively connected with said rock shaft, and a pawl actuated by said ratchet lever and coöperating with the ratchet wheel on the counter shaft.

6. A seed planter comprising a machine frame, carrying wheels therefor, a hopper mounted on the machine frame, a boot located beneath the hopper, and valve mechanism contained within the boot and embodying an abutment plate and a valve shiftable across the abutment plate and comprising oppositely arranged shoulders of equal length or projection and an intervening pocket, both of said shoulders being movable along the face of the abutment plate so that the pocket may receive the seed at one side of the abutment and discharge the same at the other side.

In testimony whereof I affix my signature in presence of two witnesses.

EDSON FITCH SPINNER.

Witnesses:
P. L. GORDON,
O. R. CLENDENIN.